US010846051B1

(12) United States Patent
Chatzipanagiotis et al.

(10) Patent No.: US 10,846,051 B1
(45) Date of Patent: Nov. 24, 2020

(54) DETERMINATION OF QUANTITATIVE VALUES REPRESENTING USER ACTION AUTOMATICITY

(71) Applicant: Amazon Technologies, Inc., Seattle, WA (US)

(72) Inventors: Nikolaos Chatzipanagiotis, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 717 days.

(21) Appl. No.: 15/671,446

(22) Filed: Aug. 8, 2017

(51) Int. Cl.
*G06F 7/02* (2006.01)
*G06N 5/02* (2006.01)
*G06N 20/00* (2019.01)
*G06F 11/00* (2006.01)

(52) U.S. Cl.
CPC .............. *G06F 7/023* (2013.01); *G06N 5/02* (2013.01); *G06N 20/00* (2019.01); *G06F 11/00* (2013.01)

(58) Field of Classification Search
CPC .................................................. G06F 21/6263
USPC ..................................................... 706/15, 45
See application file for complete search history.

(56) References Cited

U.S. PATENT DOCUMENTS

2017/0124571 A1* 5/2017 John .................. G06Q 20/4012

* cited by examiner

*Primary Examiner* — David R Vincent
(74) *Attorney, Agent, or Firm* — Eversheds Sutherland (US) LLP

(57) ABSTRACT

Systems, methods, and computer-readable media are disclosed for systems and methods of determining quantitative values representative of user action automaticity. Example methods may include determining a first request for a first user interface from a user device, determining a user identifier associated with the first request, and determining user interaction history data using the user identifier. Example methods may include determining a first selectable option for presentation in a first position at the first user interface using the user interaction history, determining a second selectable option for presentation in a second position at the first user interface, generating the first user interface, and sending the first user interface to the user device.

20 Claims, 8 Drawing Sheets

US 10,846,051 B1

DETERMINATION OF QUANTITATIVE VALUES REPRESENTING USER ACTION AUTOMATICITY

BACKGROUND

Thought processes of users before, during, and after certain user actions may be difficult to determine, let alone quantify. For example, without asking a user why the user performed a certain action, or how long the user thought about performing the action before actually doing so, determining answers to such queries may be difficult. However, the answers to such queries related to automaticity may be used to provide the user with content that is relatively more relevant to the user, reduce the user's need to take certain actions by automating certain actions or aspects of actions, and may increase efficiency for the user and for certain user computing devices. Accordingly, quantification of automaticity may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
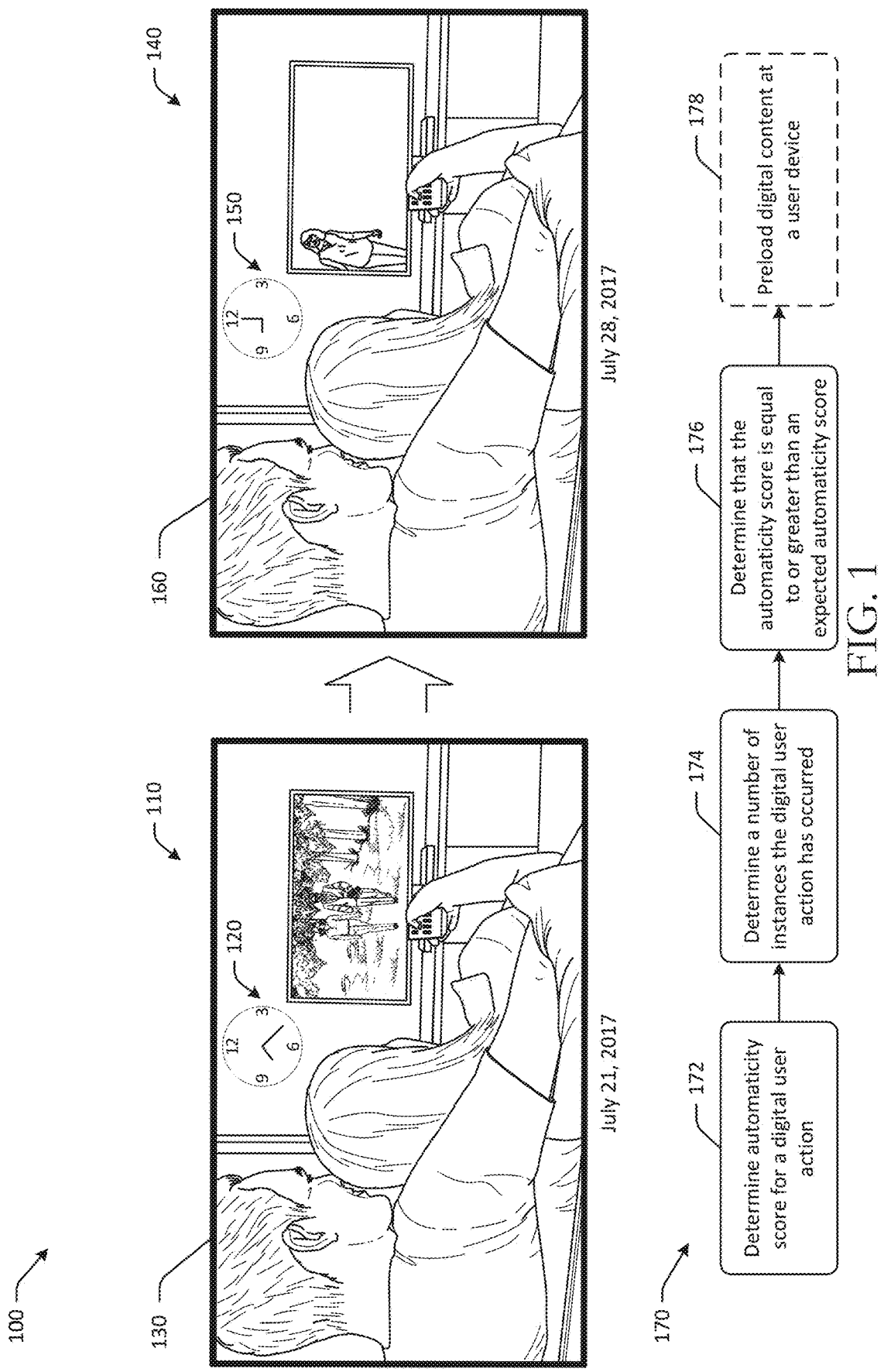
FIG. 1 is a hybrid schematic diagram and process flow of an example use case illustrating determination of quantitative values representative of user action automaticity in accordance with one or more example embodiments of the disclosure.

Users may perform certain actions out of habit, or automatically. For example, a user may turn on a television out of habit when the user returns home, or a user may go through a coffee shop drive-thru on weekdays on the way to work. Certain actions that users perform may be repetitive, but may not necessarily be automatically. For example, a user may go to the gym for four weeks in a row, but thereafter may cease going to the gym. In this example, the user may have forced themselves to go to the gym for those four weeks, but each visit to the gym may have required a high amount of effort or forethought on behalf of the user. As a result, the gym visits may have been repetitive, but not automatic. Other actions that the user takes, for example, may be both repetitive and automatic. Automatic actions may require little or no forethought before the user performs the action. Following the example above, the user may automatically go to the same coffee shop during a drive to work with little or no forethought, as it may be a routine action for the user on weekdays. On weekends, however, the user may not visit the coffee shop. Automatic actions may not be performed regularly in some instances. For example, an automatic action of ordering flowers for an anniversary may take place once a year, but may still be automatic due to the amount of forethought required.

Before a certain action becomes automatic for a user, the action may initially require deliberation and/or forethought for the user. For example, the user may first have to locate the coffee shop on the way to work, decide that the taste of the coffee or the customer service is to the user's liking, review menu choices, etc. Over time, or after a number of sessions or a number of times the user has performed the action, the action may require less and less forethought on behalf of the user. In such instances, the action may become more and more automatic for the user. Some actions, although performed a number of times by the user, may not be automatic and may never become automatic. For example, a user may visit a dentist's office annually, but may not have a particular month or week during which the visit occurs, or the user may skip certain visits altogether. The action of visiting the dentist may therefore not be automatic for the user, as indicated by the amount of forethought required to perform the action.

Embodiments of the disclosure include systems and methods for determining quantitative values representative of user action automaticity. By quantifying an automaticity, or a level of forethought required by a user before performing a certain action, embodiments of the disclosure may determine accurate predictions of user actions and when the user may perform certain actions. By doing so, embodiments of the disclosure may initiate performance of certain actions without active input from the user. For example, if the user has an automaticity value at or above a certain threshold value for turning on the television within five minutes of opening the door of a home, embodiments of the disclosure may automatically trigger the television to turn on shortly after the user is determined to have opened the door of the user's home. In another example, promotional offers or discounts may be provided to the user for goods or services that the user is likely to purchase within a predetermined time interval. For example, if the user orders pizza on Saturday evenings with an automaticity that satisfies an automaticity threshold, discount offers for pizza may be provided to the user.

This disclosure relates to, among other things, devices, systems, methods, computer-readable media, techniques, and methodologies for determining quantitative values representative of user action automaticity. Certain embodiments may therefore determine quantitative automaticity values that represent how automatic a certain action is for a user. Such automaticity values can be compared against thresholds and/or aggregated user data for the same action to determine whether the action has become automatic for the user. Certain embodiments may process large amounts of online behavior data for multiple disparate actions that users engage in in order to determine aggregate or average automaticity values. If the action has become automatic for the user, embodiments of the disclosure may implement or initiate actions on behalf of the user, or actions that may otherwise benefit the user.

Referring to FIG. 1, an example use case 100 of determining quantitative values representative of user action automaticity is illustrated in accordance with one or more embodiments of the disclosure. In FIG. 1, at a first instance in time 110, a user may perform a first instance 130 of a user action of purchasing and streaming a movie on Jul. 21, 2017, which may be a Friday. The user may perform the action at a certain time 120. For example, the user may begin the process of purchasing and streaming the movie at or around 1920 h, which may be near a dinnertime for the user. In the example of FIG. 1, the user may stream the movie from a service provider such as Prime Video.

At a second instance in time 140, the user may perform a second instance 160 of the user action of purchasing and/or streaming a movie on Jul. 21, 2018, which may be a Friday as well. The user may perform the action at a certain time 150, which happens to be 2100 h for the second instance 140. In other examples, the second instance may not be a consecutive Friday, but may be a certain number of Fridays during a time interval (e.g., the user may go on vacation, have other plans, etc.).

For some actions, familiar settings may increase the automaticity or automatic nature of a user action. For example, incremental strengthening of an association between a familiar setting and a certain user action may eventually result in automatic performance of that action for the user. At some point, certain actions may become as automatic as possible for a user, in that additional instances of performing the action may not increase the automaticity of the action for the user. At or near that point, the action may be determined to be automatic for the user.

Embodiments of the disclosure may determine an automaticity score for the user for the action of streaming a movie or other digital content for each instance the user performs the action using, in one example, a process flow 170. At operation 172, one or more remote servers may determine an automaticity score for a digital user action. Automaticity scores may be determined each time the user performs the action, such as during or after the first instance 110 of streaming the movie and during or after the second instance 140. Automaticity scores may be numerical values within a range. For example, automaticity scores or values may range from 0 to 1. In FIG. 1, the automaticity score for the user at the first instance 110 may be 0.6 and that automaticity score at the second instance 140 may be 0.7. While discussed in the context of automaticity scores in this example, other metrics or aspects of automaticity values may be used to classify users into various categories or classifications. For example, a shape, slope, trajectory, or other aspect of a plotted automaticity curve may be used to compare against a benchmark automaticity curve in order to determine a certain user's classification. The benchmark automaticity curve may be a curve generated using automaticity data from multiple users. Automaticity scores for particular users may be plotted over multiple instances or occurrences of an action, or over time generally, to generate user-specific automaticity curves.

To determine the automaticity score for the user for streaming video, the one or more remote servers may determine a request to stream video content from a user device, where the request includes a user identifier. A user interaction history for a time interval may be determined using the user identifier. The user interaction history may be used to determine a number of instances the user has performed the action. Factors that may be used to determine the automaticity score may include one or more of frequency (e.g., frequency of occurrence of the action within a fixed time window, etc.); interlude (e.g., a time between two instances of the same action or time since the last action, etc.); periodicity (e.g., a pattern of occurrence of the action, etc.); ubiquity (e.g., a percentage of transits that have the action in the session, such as 8 of 10 times the user visits Prime Video a movie is streamed, etc.); promptness (e.g., how long before the action is performed within a session, a length of session as percentage of total session duration when the action occurs, etc.); singularity (e.g., deviation from behavior normally observed for customers, such as an increase to three movies streamed per visit compared to an average of one movie for average users, etc.); and longevity (e.g., how long the user has been performing the action, etc.).

To determine frequency, the one or more remote servers may determine a number of streaming video events in the user interaction history, and may determine a first habit score value using the number of streaming video events. The first habit score value may be based at least in part on a comparison to aggregate user data for other users that have performed the same action and for which the action has become automatic. If the frequency is greater than the average for the same number of instances, the first habit score value may be relatively higher than if the frequency is lower than the average.

To determine interlude, the one or more remote servers may determine an elapsed time since a preceding streaming video event in the user interaction history, and may determine a second habit score value using the elapsed time. The second habit score value may be based at least in part on a comparison to aggregate user data for other users that have performed the same action and for which the action has become automatic. If the interlude is greater than the average for the same number of instances, the second habit score value may be relatively higher than if the interlude is lower than the average.

To determine periodicity, the one or more remote servers may determine a first timestamp of the preceding streaming video event, and may determine a second timestamp of the present or last-received request to stream video. The one or more remote servers may determine a periodicity value indicative of a consistency of streaming video events occurring during the time interval using the first timestamp and the second timestamp, and may determine a third habit score value using the periodicity value. The third habit score value may be based at least in part on a comparison to aggregate user data for other users that have performed the same action and for which the action has become automatic. If the periodicity is greater than the average for the same number of instances, the third habit score value may be relatively higher than if the periodicity is lower than the average.

To determine ubiquity, the one or more remote servers may determine a total number of user sessions during the time interval in the user interaction history, and may determine a first ratio value of the number of streaming video events to the total number of user sessions. A fourth habit score value may be determined using the first ratio value. The fourth habit score value may be based at least in part on a comparison to aggregate user data for other users that have performed the same action and for which the action has become automatic. If the ubiquity is greater than the average for the same number of instances, the fourth habit score value may be relatively higher than if the ubiquity is lower than the average.

To determine promptness, the one or more remote servers may determine a start time for a user session (e.g., session during instance 110 or instance 140, etc.) during which the request was received, and may determine a third timestamp for the request. The one or more remote servers may determine an end time for the user session, determine a second ratio value of a difference between the third timestamp and the start time to a difference between the end time and the start time, and may determining a fifth habit score value using the second ratio value. The fifth habit score value may be based at least in part on a comparison to aggregate user data for other users that have performed the same action and for which the action has become automatic. If the promptness is greater than the average for the same number of instances, the fifth habit score value may be relatively higher than if the promptness is lower than the average.

To determine singularity, the one or more remote servers may determine an aggregated user data set for users that have completed streaming video events, determine a first average number of instances of streaming video events that occur during a single user session using the aggregated user data set, and may determine a second average number of instances of streaming video events that occur during a single user session for the user identifier. The one or more remote servers may determine a difference between the first average number and the second average number, and may determine a sixth habit score value using the difference. The sixth habit score value may be based at least in part on a comparison to aggregate user data for other users that have performed the same action and for which the action has become automatic. If the singularity is greater than the average for the same number of instances, the sixth habit score value may be relatively higher than if the singularity is lower than the average.

To determine longevity, the one or more remote servers may determine a length of time between the request to stream video content and an initial instance of a streaming video event in the user interaction history, and may determine a seventh habit score value using the length of time. The seventh habit score value may be based at least in part on a comparison to aggregate user data for other users that have performed the same action and for which the action has become automatic. If the longevity is greater than the average for the same number of instances, the seventh habit score value may be relatively higher than if the longevity is lower than the average.

The automaticity score may be a function of one or more sub-score values, such as the habit score values. In one embodiment, the automaticity score may be a weighted sum value. For example, the automaticity score may be determined using the first habit score value, the second habit score value, the third habit score value, the fourth habit score value, the fifth habit score value, the sixth habit score value, and the seventh habit score value, where one or more of the habit score values is weighted differently than the others. In some embodiments, each sub-score may have the same weight. In the example of FIG. 1, the weighted sum value may be an automaticity score for streaming video events for the user identifier.

At operation 176, the one or more remote servers may determine that the automaticity score is equal to or greater than an expected automaticity score. The expected automaticity score may be an automaticity score at which the action has become, or is, automatic for the user. The expected automaticity score may be determined based at least in part on aggregated user data for other users for which automaticity scores have been determined and/or for users for which the action of streaming videos has become automatic.

Automaticity graphs or curves may be a functional representation of automaticity. Automaticity curves may follow or form an asymptotic curve with respect to the repetitions or the number of instances or times of occurrence of the action. Actions may be determined to be automatic once the automaticity curve begins to plateau. Automaticity curves may be both user-specific and action-specific. Average or aggregate automaticity curves may be determined by using values from automaticity curves for multiple users. The point or number of instances at which the aggregate automaticity curve begins to plateau may be the average point at which an action becomes automatic for an average user. Such information can be used to determine expected automaticity scores at a certain number of instances, as well as to determine an average time at which a certain action becomes automatic.

In some embodiments, automaticity scores may be plotted over time in graphical form. For example, an automaticity curve graph may be generated using the automaticity score and a number of user sessions during which an instance of the streaming video event occurred. One or more data points of the graph may be compared to data points of an aggregated automaticity curve graph for other users that have a habit of streaming video events, or for another user action.

In FIG. 1, using the automaticity score for the user, the automaticity curve graph for the user, and the aggregated automaticity curve graph, a determination may be made that the user associated with the user identifier in FIG. 1 has a habit of streaming video events on Fridays, and, in some instances, as specific as Friday evenings between 1900 h and 2200 h, or another time interval. If it is determined that the automaticity score for the user is equal to or greater than the expected automaticity score, the action of streaming content may have become automatic for the user. If the action is determined to be automatic for the user at the first instance 110, the one or more remote servers may initiate one or more response actions.

For example, at optional operation 178, the one or more remote servers may preload digital content at a user device. The preloaded content may include presenting movie suggestions at a user interface, portions of movies or digital content so as to reduce latency in streaming and/or presentation of content, and other content. In some embodiments, response actions such as powering on a television or streaming device, loading certain user interfaces, and other response actions may be initiated or implemented, so as to reduce the actions needed to be performed by the user and reduce the time to present content.

Using the automaticity scores, embodiments of the disclosure may determine when a user action has become automatic or a habit, and may determine a length of time before the action became automatic for the user. Certain embodiments may use automaticity scores to determine when or if a previously automatic action is no longer automatic, and may initiate one or more response actions. Certain embodiments may differentiate between frequent actions performed automatically by a user, and other actions performed frequently but not automatically by the user using automaticity scores.

The systems, methods, computer-readable media, techniques, and methodologies for systems and methods of determining quantitative values representative of user action automaticity may therefore determine predicted user actions based on automaticity values and initiate appropriate response actions. Management of user actions and promotional offers corresponding to automatic actions that the user may engage in may be determined in certain embodiments. As a result of improved functionality, users may consume content and engage in certain actions with less actions or inputs that otherwise required.

Example embodiments of the disclosure provide a number of technical features or technical effects. For example, in accordance with example embodiments of the disclosure, certain embodiments may reduce latency in presentation of content, determine automatic actions and implement or initiate response actions, control user devices, place orders or cause shipments to user addresses, determine free trial period lengths based on time to make an action automatic, and the like. Some embodiments may control device features, such as home automatic device and the like. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
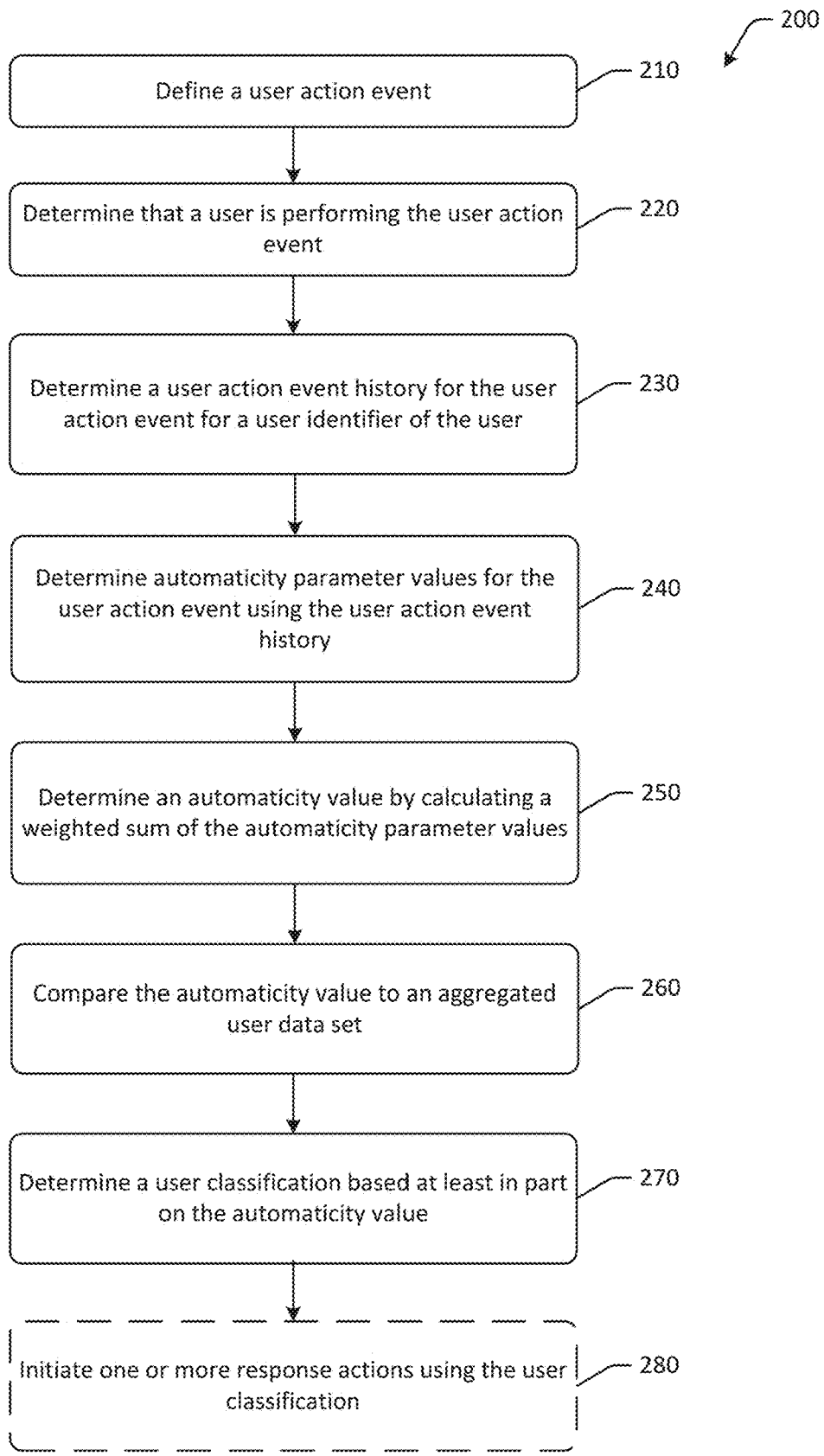
FIG. 2 is a schematic illustration of an example process flow for determining quantitative values representative of user action automaticity in accordance with one or more example embodiments of the disclosure.

FIG. 2 depicts an example process flow 200 for determining quantitative values representative of user action automaticity in accordance with one or more example embodiments of the disclosure. While example embodiments of the disclosure may be described in the context of certain user actions, it should be appreciated that the disclosure is more broadly applicable to any suitable digital or physical user action. Some or all of the blocks of the process flows in this disclosure may be performed in a distributed manner across any number of devices. The operations of the process flow 200 may be performed in a different order.

At block 210, a user action may be defined. For example, computer-executable instructions stored on a memory of a device may be executed to receive an indication of a user action for which quantitative values representative of user action automaticity may be determined. A user or operator may select or input the user action. User actions may include, for example, streaming content, operating devices, making purchases, or other user actions.

At block 220 of the process flow 200, it may be determined that a user is performing the user action event. For example, computer-executable instructions stored on a memory of a device may be executed to determine that a certain user is performing the defined user action. If the defined user action event is streaming content, a determination may be made that the user is streaming content when a user identifier associated with the user is determined to be associated with a request to stream content, in one example.

At block 230 of the process flow 200, a user action event history for the user action event may be determined for a user identifier of the user. For example, computer-executable instructions stored on a memory of a device may be executed to determine a history of streaming video for a user identifier for which the automaticity score is to be generated. The user action event history may include information related to previous sessions, such as browsing sessions, length of time of a session, actions or interactions the user had with a user interface during a session, content consumed if the session was a streaming video session, and other information.

At block 240 of the process flow 200, automaticity parameter values for the user action event may be determined using the user action event history. For example, computer-executable instructions stored on a memory of a device may be executed to determine automaticity parameter values for the defined user action event, which may be based at least in part on session data for previous interaction sessions in the user action event history. Automaticity parameters may include one or more of frequency, interlude, periodicity, ubiquity, promptness, singularity, and longevity. Other embodiments may include additional or fewer, or different, parameters for automaticity.

In one embodiment, a frequency automaticity parameter value may be determined by executing computer-executable instructions stored on a memory of a device to determine a frequency of occurrence of instances of the digital user action event in the user action event history for a time interval. The frequency of occurrence may be a number of times that the user has performed the user action event during the time interval. The frequency of occurrence may be used to at least partially determine the automaticity score for the user action event for the user.

An interlude automaticity parameter value may be determined by executing computer-executable instructions stored on a memory of a device to determine an elapsed time since a preceding instance of the digital user action event, or the last time the user performed the user action event in the user action event history. The interlude may be a value based at least in part on, or equal to, the elapsed time. The interlude may be used to at least partially determine the automaticity score for the user action event for the user.

A periodicity automaticity parameter value may be determined by executing computer-executable instructions stored on a memory of a device to determine a first timestamp of an indication of the first instance of the digital user action event. A second timestamp of a second instance of the digital user action event that occurred before the first instance may be determined. A periodicity value indicative of a consistency of the digital user action event occurring during the time period may be determined using the first timestamp and the second timestamp. The periodicity may be indicative of how consistently the user performed the user action event. For example, whether the user performed the user action event on the same day of the week, the same time of the day, at the same location, on the same device, and other factors may be used to determine the periodicity value, or an indication of the consistency of performance of the user action event. The periodicity may be used to at least partially determine the automaticity score for the user action event for the user.

A ubiquity automaticity parameter value may be determined by executing computer-executable instructions stored on a memory of a device to determine a total number of user sessions over a time interval in the user action event history, and determining a ratio of the number of user sessions with instances of the digital user action event to the total number of user sessions. The ubiquity may represent how often the user performed a certain action relative to how often the user performed a broader action. For example, a ratio of how often a user made an online purchase compared to a total number of browse sessions may indicate ubiquity of making an online purchase for the particular user. The determined ratio and/or ubiquity automaticity parameter value may be used to at least partially determine the automaticity score for the user action event for the user.

A promptness automaticity parameter value may be determined by executing computer-executable instructions stored on a memory of a device to determine a user session start time for a particular user session during which the user performed the user action event. A timestamp for the indication of the digital user action event may be determined, where the timestamp is the time at which the user performed the user action event during the session. A user session end time for the user session may be determined. A ratio of a difference between the timestamp and the user session start time to a difference between the user session end time and the user session start time may be determined, and the ratio may be used to at least partially determine the automaticity score for the user action event for the user.

A singularity automaticity parameter value may represent a difference in behavior for the particular user compared to aggregate and/or average user behavior. Singularity automaticity parameter values may be determined by executing computer-executable instructions stored on a memory of a device to determine a first average number of instances of the digital user action event that occur during a single user session using an aggregated user data set, and determining a second average number of instances of the digital user action event that occur during a single user session particularly for the user identifier. A difference between the first average number and the second average number may be determined, and the difference value may be used to at least partially determine the automaticity score for the user action event for the user.

A longevity automaticity parameter value may represent a length of time that the user has been performing the user action event. Longevity automaticity parameter values may be determined by executing computer-executable instructions stored on a memory of a device to determine a length of time between a current instance of the user action event and an initial instance of the digital user action event during a time interval of the user action event history for the user. The longevity, or a representative value, may be used to at least partially determine the automaticity score for the user action event for the user. Other factors may be used to determine automaticity scores.

At block 250 of the process flow 200, an automaticity value may be determined by calculating a weighted sum of the automaticity parameter values. For example, in some embodiments, one or more automaticity parameter values may be weighted differently, while in other embodiments, each automaticity parameter value may have the same weight. In an embodiment, computer-executable instructions stored on a memory of a device may be executed to calculate a weighted sum of the automaticity parameter values. The automaticity score or value for the user action event for the user may be the result of the weighted sum.

At block 260 of the process flow 200, the automaticity value may be compared to an aggregated user data set. For example, computer-executable instructions stored on a memory of a device may be executed to determine an aggregated user data set that may include data related to other users that have performed the user action event. The automaticity value may be compared to the aggregated user data for the same user action and, in some instances, at the same number of sessions for the aggregated user data set. In some embodiments, a curve or other line may be generated using the aggregated user data set, and the automaticity value or score may be plotted on the curve, so as to determine whether the automaticity value is greater than or less than the value at the curve for the same number of instances or sessions.

At block 270 of the process flow 200, a user classification based at least in part on the automaticity value may be determined. For example, computer-executable instructions stored on a memory of a device may be executed to determine whether the automaticity value is equal to or greater than the expected value as determined using the aggregated data set. If the automaticity value is greater than the expected value, and the expected value indicates that the user has a habit of performing that action, the user may be classified as having a habit for performing the user action. If the automaticity value is less than the expected value, and the expected value indicates that the user has a habit of performing that action, the user may be classified as not having a habit for performing the user action. Other user classifications, such as losing a habit, gaining a habit, habitual, non-habitual, and other classifications may be determined.

At optional block 280 of the process flow 200, one or more response actions may be initiated using the user classification. For example, computer-executable instructions stored on a memory of a device may be executed to initiate a response action of providing the user a promotional offer or a discount on streaming movies or on popcorn if the user is classified as a habitual user, or a response action of suggesting alternative products or brands in product recommendations if the user is classified as having lost a habit, which may indicate the user is interested in something else rather than the former habit.

Figure 3:
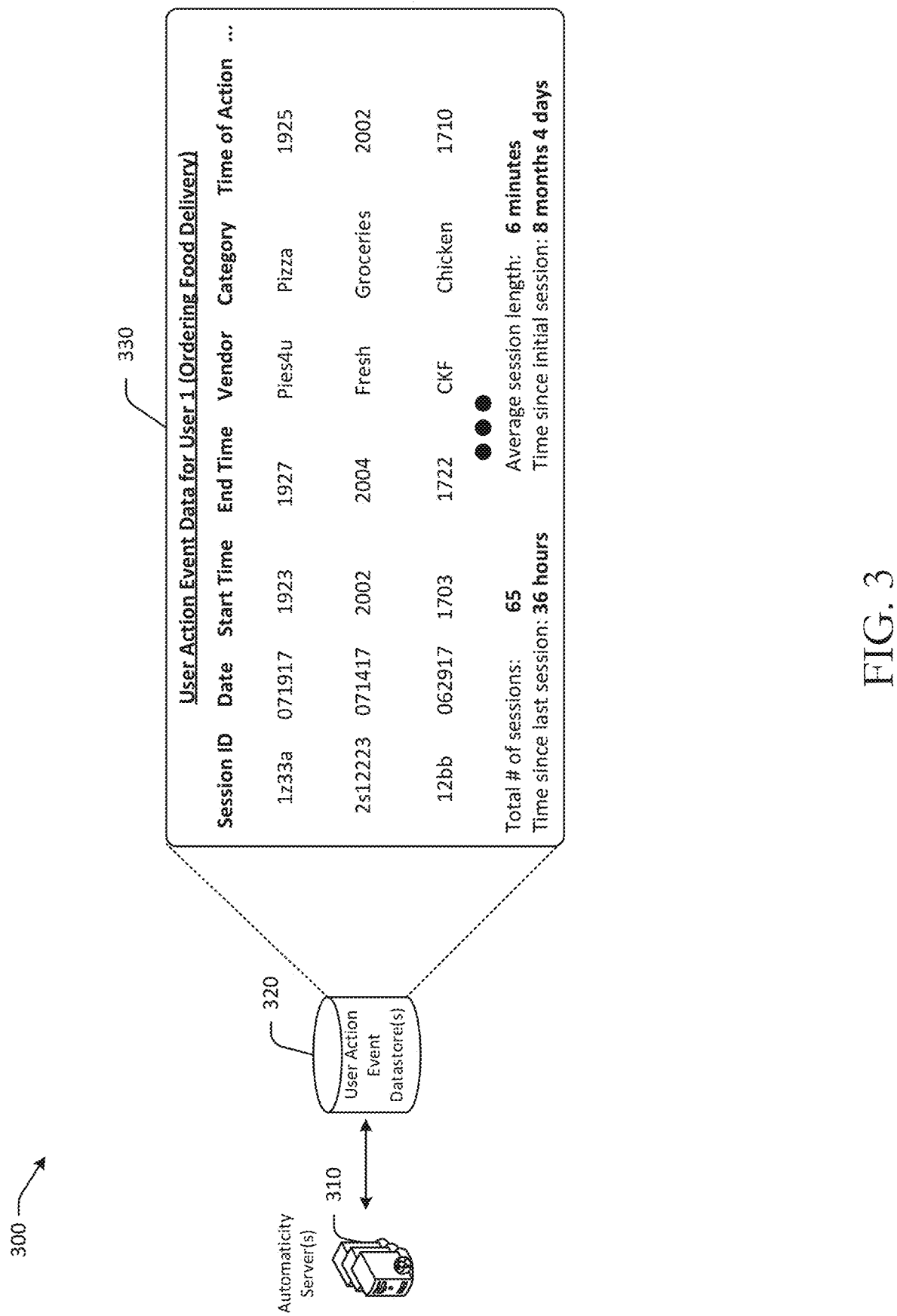
FIG. 3 is a schematic illustration of an example database with aggregated user action and automaticity data in accordance with one or more example embodiments of the disclosure.

FIG. 3 depicts a schematic illustration of an example database with aggregated user action and automaticity data in accordance with one or more example embodiments of the disclosure. In FIG. 3, an example system 300 may include one or more automaticity servers 310 in communication with one or more user action event datastore(s) 320. The user action event datastore(s) 320 may include user action event data for specific actions linked to respective user identifiers. For example, user action event data 330 for a particular user and particular event of ordering food delivery may be stored at the user action event datastore(s) 320. The user action event data 330 may include historical data related to a number of instances the event has occurred, the last session or occurrence, an elapsed time since the last or preceding session, session length data, a time the action occurred during the session, a time elapsed since the first instance the action occurred or the initial instances, a start time for sessions, an end time for sessions, and so forth. The data included in the user action event data 330 may be used to calculate automaticity scores for the particular action for the user.

Figure 4:
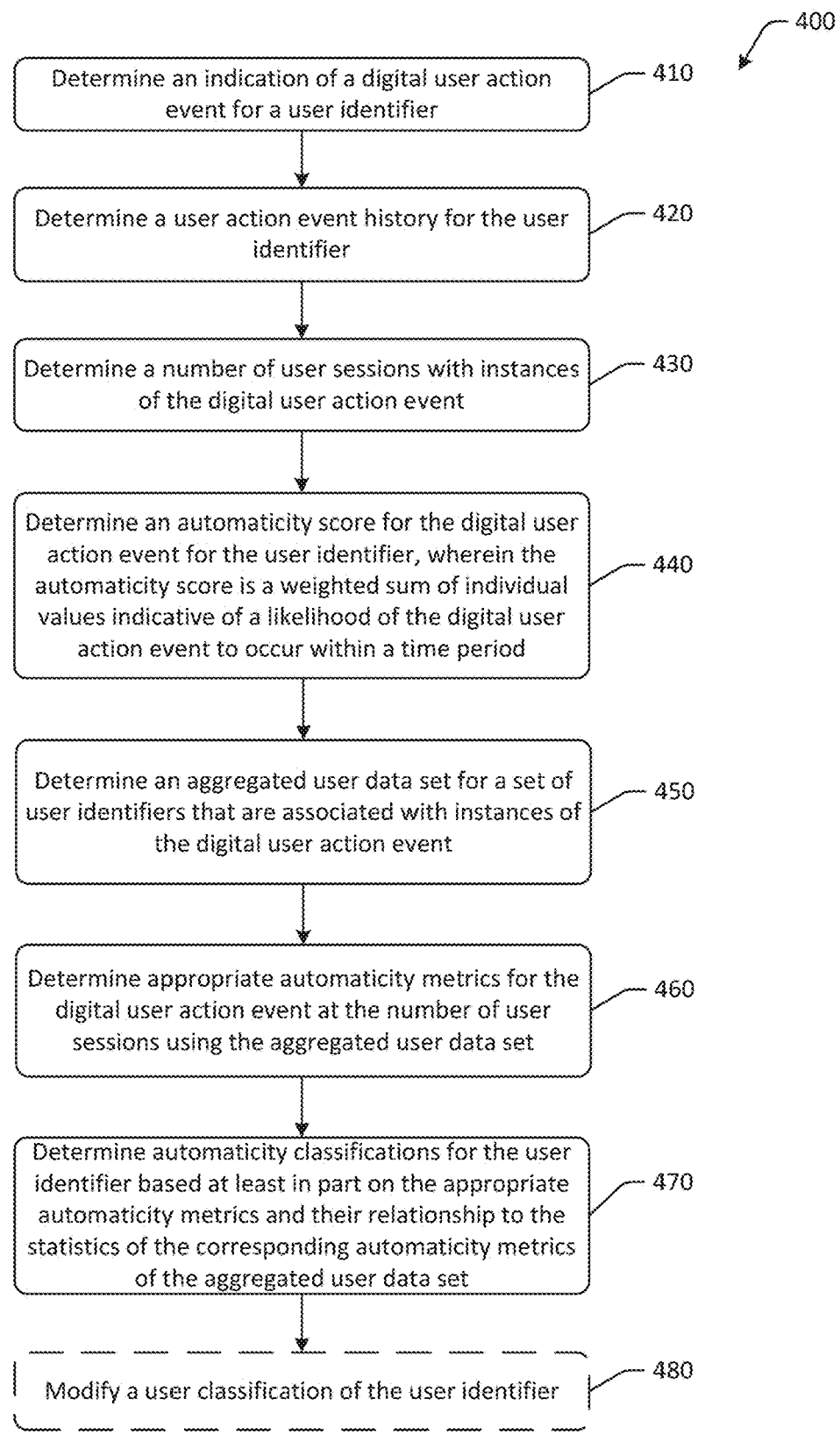
FIG. 4 is a schematic illustration of an example process flow for determining quantitative values representative of user action automaticity in accordance with one or more example embodiments of the disclosure.

FIG. 4 depicts a schematic illustration of an example process flow 400 for determining quantitative values representative of user action automaticity in accordance with one or more example embodiments of the disclosure. Some or all of the blocks of the process flows in this disclosure may be performed in a distributed manner across any number of devices. The operations of the process flow 400 may be performed in a different order.

At block 410 of the process flow 400, an indication of a digital user action event for a user identifier may be determined. For example, a user may request certain content, place an online order, play a game, order food, or otherwise interaction with a user interface element on an electronic display to perform a digital user action event.

At block 420, a user action event history for the user identifier may be identified. For example, based at least in part on the user interaction history for the user identifier, which may be clickstream data or another datastore of user actions, data related to the specific user action event for the user may be determined using the historical data.

At block 430, a number of user sessions with instances of the digital user action event may be determined. For example, the user may have engaged in 20 previous user sessions that included browsing a particular website or marketplace. A number of browse sessions that included the user adding a product to a cart may be determined to be 6 sessions, in an example.

At block 440, an automaticity score for the digital user action event for the user identifier may be determined, wherein the automaticity score is a weighted sum of individual values indicative of a likelihood of the digital user action event to occur within a time period. For example, factors such as frequency, interlude, promptness, and other factors may be used to determine an automaticity score the digital user action event. The automaticity score may be a weighed sum in some embodiments. The automaticity score may indicate that the user is likely to perform a certain action within a time period. For example, the user may be determined to have a habit of ordering food using Amazon Restaurants on Monday evenings, and the automaticity score may indicate that the user is likely to order food using Amazon Restaurants on a future Monday evening.

At block 450, an aggregated user data set for a set of user identifiers that are associated with instances of the digital user action event may be determined. The aggregated user data set may be for one or more other user identifiers that have performed the same digital user action event. In some embodiments, the user identifiers in the aggregated user data set may be selected based at least in part on a similarity (e.g., demographic, location, zip code, gender, etc.) to the user identifier for which the automaticity score was determined.

At block 460, appropriate automaticity metrics for the digital user action event at the number of user sessions may be determined using the aggregated user data set In an example, an appropriate automaticity metric may be an average automaticity score for the digital user action event at the number of user sessions. An average automaticity score may be determined using the aggregated user data set. For example, based at least in part on the number of instances in which the user has performed the action, the average automaticity value for the other users that have performed the same action the same number of times may be determined. If the user has performed the action five times, then the average automaticity value for users at the time they performed the action five times may be determined.

At block 470, automaticity classifications for the user identifier may be determined based at least in part on the appropriate automaticity metrics and their relationship to the statistics of the corresponding automaticity metrics of the aggregated user data set. In one example, a shape, curve, trajectory, or other aspect of an automaticity score may be compared to other automaticity curves or aggregated automaticity curves to classify a user or determine whether the user has formed a particular habit.

In one example, automaticity classifications may be determined by comparing one or more automaticity scores. In one instance, it may be determined that the automaticity score for a user for a particular event is equal to or greater than an average automaticity score for aggregated users. For example, if the average automaticity score is 6.5 on a scale of 0 to 10, and the automaticity score for the user is 6.7, it may be determined that the automaticity score is equal to or greater than the average automaticity score. The user may thus be classified as more rapidly forming a particular habit, having formed a habit, or another classification.

At optional block 480, a user classification of the user identifier may be modified. For example, the user may be modified from a user classification of non-habitual to a user classification of habitual.

In some embodiments, future user actions may be predicted and used to select appropriate response actions. For example, a predicted date and time for an instance of a certain digital user action event may be determined, and a discount offer for the user identifier may be generated and sent to the user before or after the predicted date and time.

In some embodiments, product recommendations may be sent to users based on similar user attributes. For example, if the user has a habit of purchasing groceries online, and other users who have the same habit also have a habit of buying organic products or food deliveries, but the user does not have a habit of buying organic products or food deliveries, product recommendations for organic products or food deliveries may be generated for the user. In some embodiments, it may be determined that a number of the set of similar user identifiers are associated with a second digital user action event such as buying organic products or food deliveries, and recommendations for the second digital user action event and/or organic products or food deliveries may be generated for the user identifier.

Figure 5:
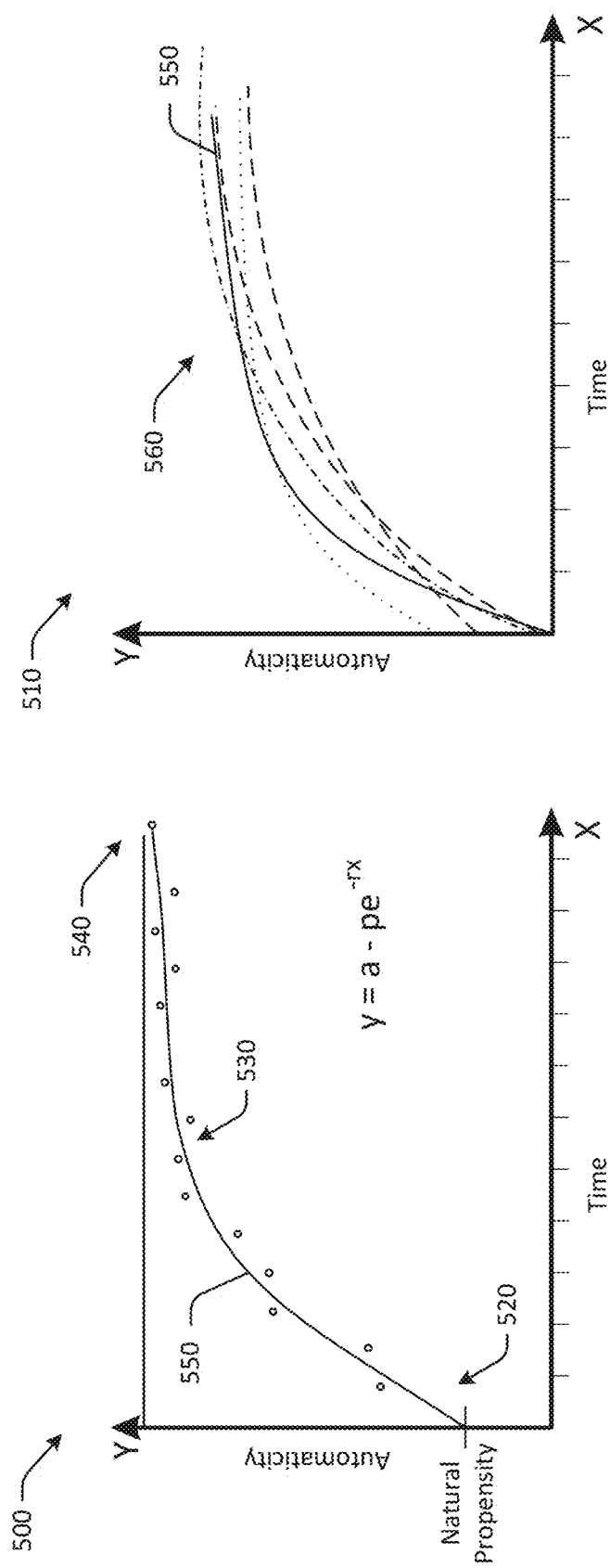
FIG. 5 is a schematic illustration of an example automaticity curve graph with plotted data points in accordance with one or more example embodiments of the disclosure.

FIG. 5 depicts a schematic illustration of an example automaticity curve graph 500 with plotted data points in accordance with one or more example embodiments of the disclosure. FIG. 5 also depicts an aggregated user data automaticity curve graph 510 including automaticity curves for multiple different users.

Automaticity graphs or curves may be a functional representation of automaticity. Automaticity curves may follow or form an asymptotic curve with respect to the repetitions or the number of instances or times of occurrence of the action, or over time generally. Actions may be determined to be automatic once the automaticity curve begins to plateau. Automaticity curves may be both user-specific and action-specific. Average or aggregate automaticity curves may be determined by using values from automaticity curves for multiple users. The point or number of instances at which the aggregate automaticity curve begins to plateau may be the average point at which an action becomes automatic for an average user. Such information can be used to determine expected automaticity scores at a certain number of instances, as well as to determine an average time at which a certain action becomes automatic.

As can be seen from the slope of the graphs in FIG. 5, early repetitions of actions may result in larger increases in automaticity as, in one example, the association between a setting and an action is established. For some actions, familiar settings may increase the automaticity or automatic nature of a user action. For example, incremental strengthening of an association between a familiar setting and a certain user action may eventually result in automatic performance of that action for the user. At some point, certain actions may become as automatic as possible for a user, in that additional instances of performing the action may not increase the automaticity of the action for the user. At or near that point, the action may be determined to be automatic for the user.

In FIG. 5, the aggregated user data automaticity curve graph 510 may include a number of automaticity curves 560 for multiple users that have performed the defined action a number of times, or over time. As denoted on the X-axis in FIG. 5, time may be a number of sessions, a number of occurrences of a certain action, a number of days or other period of time, a number of visits, a number of transits, or any other suitable metric of time. Average values for one or more, or each, instance the action was performed may be determined using the automaticity curves 560, and an aggregated user data automaticity curve 550 may be generated.

The automaticity curve graph 500 may be for a specific user, and may include plotted data points representing the user's specific automaticity scores relative to the aggregated user data automaticity curve 550. Certain embodiments may use non-linear regression to fit a curve for each individual user's data (e.g., across multiple sessions for each action, etc.). The automaticity curve graph 500 may have a default starting point at 0 sessions equal to a "natural propensity" value 520 that may indicate the natural automaticity value for an average user, as determined by the automaticity curves 560. In the automaticity curve graph 500, as the user reaches automaticity values near a region 530 where a size of increases in automaticity value begins to reduce, the user may be determined to be forming a habit. At a number of instances 540 or earlier, the user may be determined to have a habit of performing the action. For users for which no user action data history is available, portions of the aggregated user data set may be used for the user until further information is available and a user-specific automaticity score can be determined. For example, if it is determined that the number of user sessions with instances of a digital user action event is zero user sessions, an average initial value or natural propensity may be determined using the aggregated user data set, and used to determine an automaticity score for the digital user action event for the user identifier.

In some embodiments, a formula may be used to determine an amount of time or a number of sessions until the user's automaticity score is about 95% of the asymptote present in the graphs of FIG. 5. The formula may be, in one example, $y=a-p*\exp(-rx)$, where y is the automaticity score, x encodes the time dimension, a is the asymptote value of the automaticity curve, r is the rate constant of habit formation as determined based on aggregated user data (e.g., the rate constant that represents the rate at which the maximum is reached), and p is the natural propensity of the customer to take the action (e.g., when x=0 (e.g., 0 sessions or elapsed time, etc.)). The time or number of sessions to reach 95% of asymptote may be $-\ln(a/20p)/r$, which may be the habit formation time. In some embodiments, a rate of formation may be determined using the aggregated user data set, and the rate of formation can be used to determine the automaticity score for a digital user action event for a user.

Figure 6:
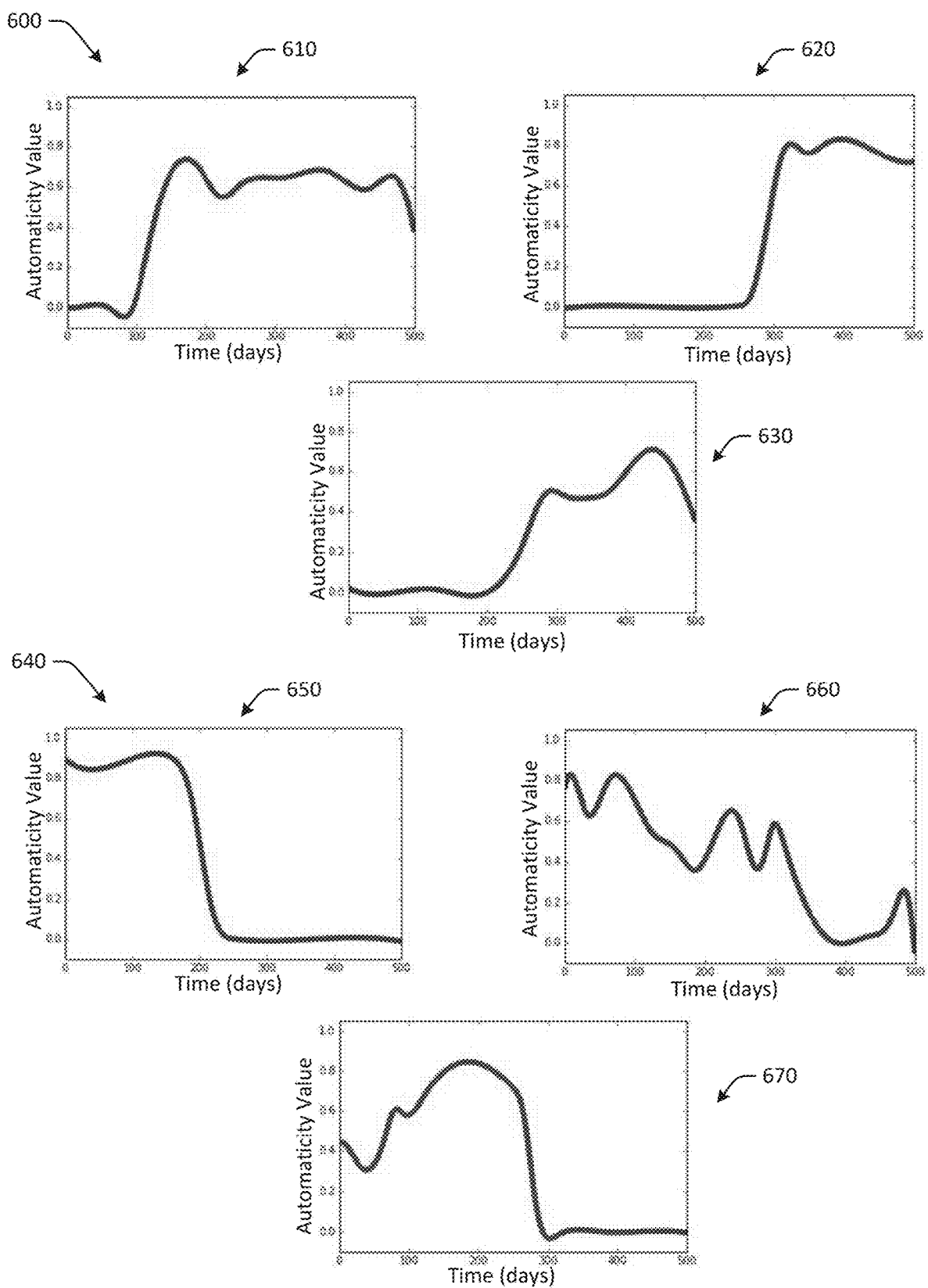
FIGS. 6-7 are schematic illustrations of example automaticity curve graphs of users exhibiting various characteristics in accordance with one or more example embodiments of the disclosure.
Figure 7:
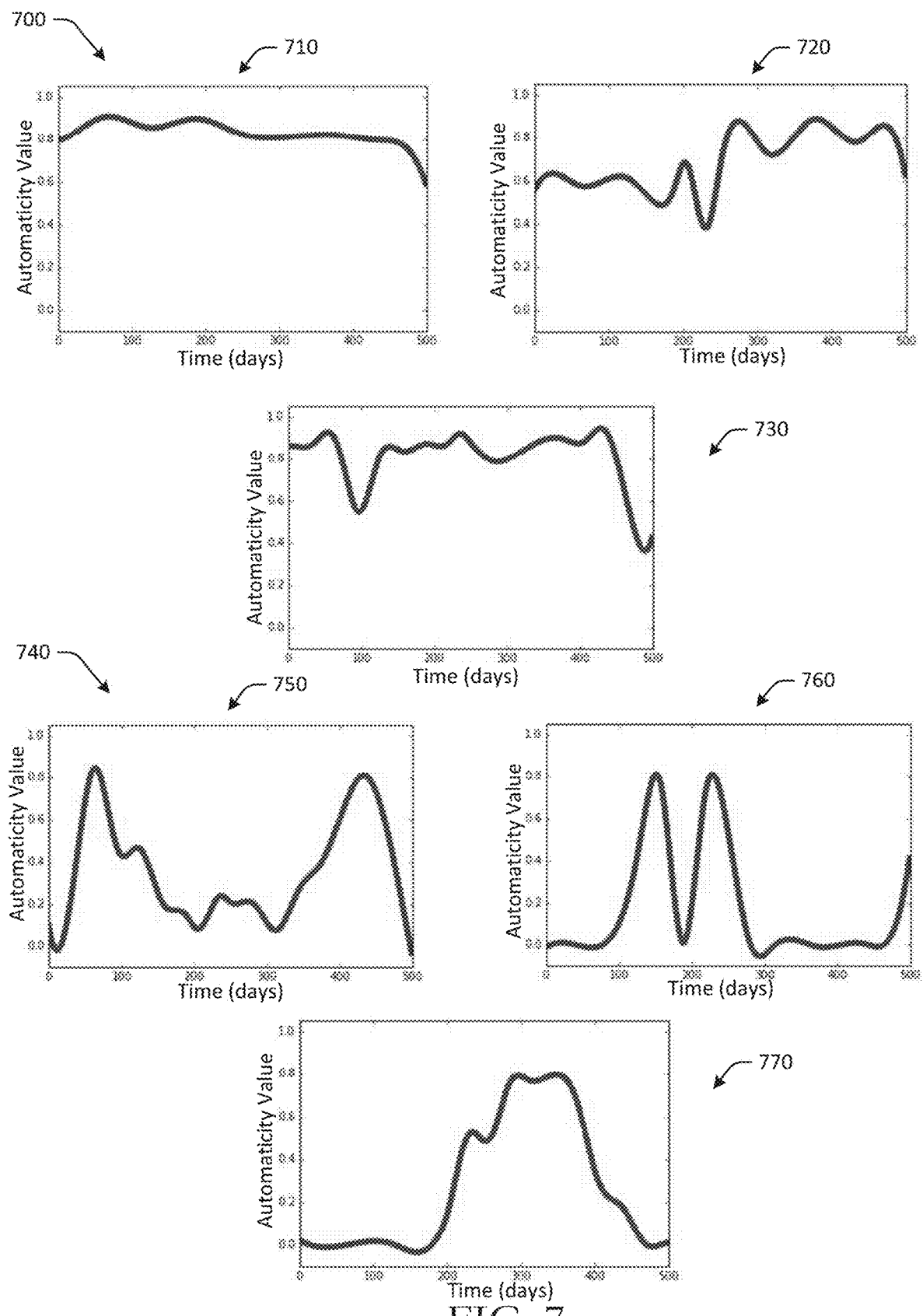

FIGS. 6-7 depict schematic illustrations of example automaticity curve graphs of users exhibiting various characteristics in accordance with one or more example embodiments of the disclosure. In FIG. 6, a first set of graphs 600 illustrate plotted automaticity values over time for users that developed a habit, or for whom performance of certain actions became automatic. In a first example graph 610, a user may have an automaticity score that rapidly increases and then varies but stays at or near a certain automaticity value, which can be used to determine whether another user has the same habit. Similarly, in a second example graph 620, the user may have an automaticity score that rapidly increases and then plateaus at a certain value or range. In a third example graph 630, a user may have an automaticity score for an action that gradually increases (relative to the first example graph 610 and the second example graph 620), and that plateaus at a value that may be less than that in the first example graph 610 and the second example graph 620. The user may nonetheless be determined to have the same habit.

A second set of graphs 640 illustrate plotted automaticity values over time for users that developed a habit, but have since lost habit and/or the action is no longer automatic for them. In a first example graph 650, a user may have an automaticity score that rapidly decreases and plateaus at a value that is less than a previous value. In a second example graph 660, the user may have an automaticity score that generally decreases over time but includes some local variations that increase and/or decrease. In a third example graph 670, a user may have an automaticity score for an action that gradually increases, and then rapidly decreases to a plateau. The user may be determined to have lost the habit at a value determined using the graphs, in one example. In some instances, a user may be determined to be losing a habit before the habit is actually lost. In such instances, response actions to preserve the habit, such as discounts, recommendations, and the like may be initiated. In some embodiments, response actions to revive or preserve a habit, or provide alternative recommendations, may be initiated if a declining habit threshold is satisfied. A declining habit threshold may be a difference in automaticity scores over a certain number of instances or a certain time, which may be represented by the rapid declines in the second set of graphs 640. For example, if the user's automaticity curve for an action is similar to that of another user's automaticity curve that lost the habit, the user may be disassociated from targeted content for the particular user action, such as streaming video events, as the user may no longer be interested in such actions.

A third set of graphs 700 illustrate plotted automaticity values over time for users that have persistent highly habitual behavior. In a first example graph 710, a user may have an automaticity score that is relatively steady at a constant value, indicating the persistent nature of the habitual user action. In a second example graph 720, the user may have an automaticity score that oscillates or varies within a relatively small range, but stays over a minimum automaticity value to indicate the action is automatic. Similarly, in a third example graph 730, a user may have an automaticity score for an action that has some drops over time, but may still indicate the persistent highly habitual behavior because, for example, the user may travel regularly and may only perform the action when at a home location, or for another reason. The user may still be determined to have persistent highly habitual behavior.

A fourth set of graphs 740 illustrate plotted automaticity values over time for users that have behaviors that move up or down, or that may sometimes be habits and may sometimes not be habits. In a first example graph 750, a user may have an automaticity score that varies widely between peaks and valleys. Such variations may indicate that the user may have a habit, and then may abandon the habit, and then may return to the habit, etc. In a second example graph 760, the user may have an automaticity score that is relatively steady but includes some peaks, which may indicate that the user has a personality that allows for actions to easily become automatic. Similarly, in a third example graph 770, a user may have an automaticity score for an action that rapidly increases, but then has a sustained relatively high value over a period of time, and then returns to a baseline. Each of these graphs may indicate users that have behaviors that move up or down, and can be used to predict a classification of future users.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 8:
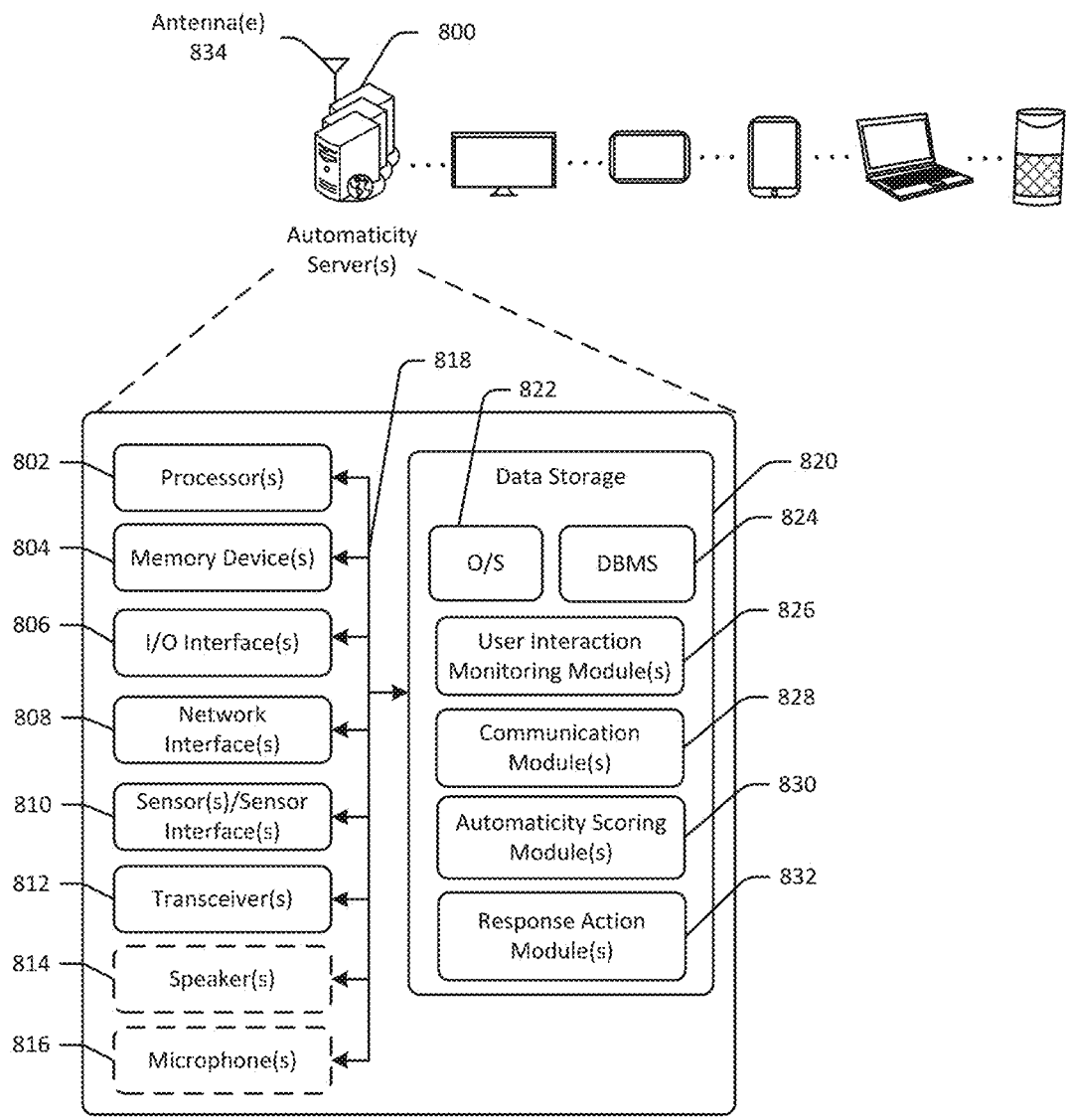
FIG. 8 is a schematic block diagram of an illustrative computer device in accordance with one or more example embodiments of the disclosure.

FIG. 8 is a schematic block diagram of an illustrative automaticity server(s) 800 in accordance with one or more example embodiments of the disclosure. The automaticity server(s) 800 may include any suitable computing device capable of receiving and/or generating data and generating user interfaces or components, including, but not limited to, a streaming audio device, a mobile device such as a smartphone, tablet, e-reader, wearable device, or the like; a desktop computer; a laptop computer; a content streaming device; a set-top box; or the like. The automaticity server(s) 800 may correspond to an illustrative device configuration for the remote servers of FIGS. 1-7. In some embodiments, the automaticity server(s) 800 may be one server in a fleet of servers, or may be a group of servers, or may be a single server. In some embodiments, a single remote server or single group of remote servers may be configured to perform more than one type of product recommendation and/or search query tracking functionality.

The automaticity server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the automaticity server(s) 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The automaticity server(s) 800 may further include one or more buses 818 that functionally couple various components of the automaticity server(s) 800. The automaticity server(s)

800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the automaticity server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the automaticity server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more user interaction monitoring module(s) 826, one or more communication module(s) 828, one or more automaticity scoring module(s) 830, and/or one or more response action module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the automaticity server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, purchase history information, device identifier information, user profile information, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the automaticity server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the user interaction monitoring module(s) 826 may include computer-executable instructions, code, or the like that responsive to execution by one or more of the processor(s) 802 may perform functions including, but not limited to, monitoring user interaction data at user devices, determining real-time or near real-time user interaction metrics for a number of different pieces of content or cards from a plurality of user devices, receiving user interaction data from a plurality of devices, determining user action events and frequencies of occurrences, defining user action events, and the like.

The communication module(s) 828 may include computer-executable instructions, code, or the like that responsive to execution by one or more of the processor(s) 802 may perform functions including, but not limited to, communicating with one or more devices, for example, via wired or wireless communication, communicating with remote servers, communicating with remote datastores, sending or receiving notifications, communicating with cache memory data, and the like.

The automaticity scoring module(s) 830 may include computer-executable instructions, code, or the like that responsive to execution by one or more of the processor(s) 802 may perform functions including, but not limited to, determining automaticity metrics or parameters, determining weighting values, determining weighted sums, determining automaticity scores, determining aggregate user data, generating graphs, comparing graphs or data points, plotting values on graphs and charts, determining whether a habit is present, determining changes in habits, and the like.

The response action module(s) 832 may include computer-executable instructions, code, or the like that responsive to execution by one or more of the processor(s) 802 may perform functions including, but not limited to, determining response actions for habits and changes in habits, determining promotional offers, sending promotional offers, sending content and communications, detecting declining habits, identifying response actions, initiating execution of response actions, placing orders for physical products, and the like.

Referring now to other illustrative components depicted as being stored in the data storage 820, the 0/S 822 may be loaded from the data storage 820 into the memory 804 and may provide an interface between other application software executing on the automaticity server(s) 800 and hardware resources of the automaticity server(s) 800. More specifically, the 0/S 822 may include a set of computer-executable instructions for managing hardware resources of the automaticity server(s) 800 and for providing common services to other application programs (e.g., managing memory allocation among various application programs). In certain example embodiments, the 0/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the automaticity server(s) 800 is a mobile device, the DBMS 824 may be any suitable light-weight DBMS optimized for performance on a mobile device.

Referring now to other illustrative components of the automaticity server(s) 800, the input/output (I/O) interface(s) 806 may facilitate the receipt of input information by the automaticity server(s) 800 from one or more I/O devices as well as the output of information from the automaticity server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the automaticity server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The automaticity server(s) 800 may further include one or more network interface(s) 808 via which the automaticity server(s) 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the automaticity server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the automaticity server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the automaticity server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the automaticity server(s) 800 may include alternate and/or additional hardware, software, or firmware components beyond those described or depicted without departing from the scope of the disclosure. More particularly, it should be appreciated that software, firmware, or hardware components depicted as forming part of the automaticity server(s) 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to at least one memory, a request to stream video content from a user device, the request comprising a user identifier;
   determining a user interaction history for a time interval using the user identifier;
   determining a number of streaming video events in the user interaction history;
   determining a first habit score value using the number of streaming video events;
   determining an elapsed time since a preceding streaming video event in the user interaction history;
   determining a second habit score value using the elapsed time;
   determining a first timestamp of the preceding streaming video event;
   determining a second timestamp of the request;
   determining a periodicity value indicative of a consistency of streaming video events occurring during the time interval using the first timestamp and the second timestamp;
   determining a third habit score value using the periodicity value;
   determining a total number of user sessions during the time interval in the user interaction history;
   determining a first ratio value of the number of streaming video events to the total number of user sessions;
   determining a fourth habit score value using the first ratio value;
   determining a start time for a user session during which the request was received;
   determining a third timestamp for the request;
   determining an end time for the user session;
   determining a second ratio value of a difference between the third timestamp and the start time to a difference between the end time and the start time;

determining a fifth habit score value using the second ratio value;
determining an aggregated user data set for users that have completed streaming video events;
determining a first average number of instances of streaming video events that occur during a single user session using the aggregated user data set;
determining a second average number of instances of streaming video events that occur during a single user session for the user identifier;
determining a difference between the first average number and the second average number;
determining a sixth habit score value using the difference;
determining a length of time between the request and an initial instance of a streaming video event in the user interaction history;
determining a seventh habit score value using the length of time;
determining a weighted sum value using the first habit score value, the second habit score value, the third habit score value, the fourth habit score value, the fifth habit score value, the sixth habit score value, and the seventh habit score value, wherein the weighted sum value is an automaticity score for streaming video events for the user identifier;
generating an automaticity curve graph using the automaticity score and a number of user sessions during which an instance of the streaming video event occurred;
comparing the automaticity curve graph to an aggregated automaticity curve graph for other users that have a habit of streaming video events; and
determining, using the automaticity score, the automaticity curve graph, and the aggregated automaticity curve graph, that a user associated with the user identifier has a habit of streaming video events.

2. The method of claim 1, further comprising:
determining a predicted date and time for a subsequent streaming video session using the user interaction history after determining that the user associated with the user identifier has a habit of streaming video events;
generating a streaming video discount offer for the user identifier; and
causing the streaming video discount offer to be presented prior to the predicted date and time.

3. The method of claim 1, wherein the request is a first request and the automaticity score is a first automaticity score, the method further comprising:
determining a second request to stream video content from the user device;
determining a second automaticity score for streaming video events for the user identifier;
determining that the second automaticity score is less than the first automaticity score;
determining that a difference between the second automaticity score and the first automaticity score satisfies a declining habit threshold; and
disassociating the user identifier with targeted content for streaming video events.

4. The method of claim 1, wherein the user identifier is a first user identifier, the method further comprising:
determining user category information using the user identifier;
determining a set of similar user identifiers using the user category information, wherein the set of similar user identifiers comprises other users with the habit of streaming video events;
determining that a number of the set of similar user identifiers are associated with a habit of food delivery events; and
generating a food delivery event recommendation for the user identifier.

5. A method comprising:
determining, by one or more computer processors coupled to at least one memory, an indication of a digital user action event for a user identifier;
determining a user action event history for the user identifier;
determining a number of user sessions with instances of the digital user action event;
determining an automaticity score for the digital user action event for the user identifier, wherein the automaticity score is a weighted sum of individual values indicative of a likelihood of the digital user action event to occur within a time period;
determining an aggregated user data set for a set of user identifiers that are associated with instances of the digital user action event;
determining an automaticity metric for the digital user action event at the number of user sessions using the aggregated user data set;
comparing the automaticity score to the automaticity metric; and
modifying a user classification of the user identifier.

6. The method of claim 5, wherein the digital user action event is a first instance of the digital user action event, the method further comprising:
determining a predicted date and time for a second instance of the digital user action event;
generating a discount offer for the user identifier; and
causing the discount offer to be presented prior to the predicted date and time.

7. The method of claim 5, wherein the digital user action event is a first digital user interaction event, and the set of user identifiers is a set of similar user identifiers, the method further comprising:
determining that a number of the set of similar user identifiers are associated with a second digital user action event; and
generating a recommendation for second digital user action event for the user identifier.

8. The method of claim 5, further comprising:
generating a curve using the aggregated user data set; and
plotting the automaticity score on the curve.

9. The method of claim 5, wherein determining the number of user sessions with instances of the digital user action event comprises determining that the number of user sessions with instances of the digital user action event is zero user sessions, the method further comprising:
determining an average initial value using the aggregated user data set, wherein determining the automaticity score for the digital user action event for the user identifier comprises determining that the automaticity score for the digital user action event for the user identifier is the average initial value.

10. The method of claim 5, further comprising:
determining a rate of formation using the aggregated user data set, wherein determining the automaticity score for the digital user action event for the user identifier comprises determining the automaticity score for the digital user action event for the user identifier using the rate of formation.

11. The method of claim 5, wherein the digital user action event is a first instance of the digital user action event, and the automaticity score is a first automaticity score, the method further comprising:
  determining an expected automaticity score for a second digital user action event;
  determining an indication of a second instance of the digital user action event for the user identifier;
  determining that a second automaticity score for the second instance is less than the expected automaticity score; and
  initiating one or more response actions.

12. The method of claim 5, further comprising:
  determining a frequency of occurrence of instances of the digital user action event in the user action event history for a time interval;
  wherein determining the automaticity score for the digital user action event for the user identifier comprises determining the automaticity score for the digital user action event for the user identifier using the frequency of occurrence.

13. The method of claim 5, wherein the digital user action event is a first instance of the digital user action event, the method further comprising:
  determining an elapsed time since a second instance of the digital user action event, wherein the second instance occurred before the first instance;
  wherein determining the automaticity score for the digital user action event for the user identifier comprises determining the automaticity score for the digital user action event for the user identifier using the elapsed time.

14. The method of claim 5, wherein the digital user action event is a first instance of the digital user action event, further comprising:
  determining a first timestamp of the indication of the first instance of the digital user action event;
  determining a second timestamp of a second instance of the digital user action event that occurred before the first instance; and
  determining a periodicity value indicative of a consistency of the digital user action event occurring during the time period using the first timestamp and the second timestamp;
  wherein determining the automaticity score for the digital user action event for the user identifier comprises determining the automaticity score for the digital user action event for the user identifier using the periodicity value.

15. The method of claim 5, further comprising:
  determining a total number of user sessions over a time interval in the user action event history; and
  determining a ratio of the number of user sessions with instances of the digital user action event to the total number of user sessions;
  wherein determining the automaticity score for the digital user action event for the user identifier comprises determining the automaticity score for the digital user action event for the user identifier using the ratio.

16. The method of claim 5, further comprising:
  determining a user session start time for a user session, wherein the indication of the digital user action event is determined during the user session;
  determining a timestamp for the indication of the digital user action event;
  determining a user session end time for the user session; and
  determining a ratio of a difference between the timestamp and the user session start time to a difference between the user session end time and the user session start time;
  wherein determining the automaticity score for the digital user action event for the user identifier comprises determining the automaticity score for the digital user action event for the user identifier using the ratio.

17. The method of claim 5, further comprising:
  determining a first average number of instances of the digital user action event that occur during a single user session using the aggregated user data set;
  determining a second average number of instances of the digital user action event that occur during a single user session for the user identifier; and
  determining a difference between the first average number and the second average number;
  wherein determining the automaticity score for the digital user action event for the user identifier comprises determining the automaticity score for the digital user action event for the user identifier using the difference.

18. The method of claim 5, wherein the digital user action event is a first instance of the digital user action event, the method further comprising:
  determining a length of time between the first instance and an initial instance of the digital user action event during a time interval of the user action event history;
  wherein determining the automaticity score for the digital user action event for the user identifier comprises determining the automaticity score for the digital user action event for the user identifier using the length of time.

19. A device comprising:
  at least one memory that stores computer-executable instructions; and
  at least one processor configured to access the at least one memory and execute the computer-executable instructions to:
    determine an indication of a digital user action event for a user identifier;
    determine a user action event history for the user identifier;
    determine a number of user sessions with instances of the digital user action event;
    determine an automaticity score for the digital user action event for the user identifier, wherein the automaticity score is a weighted sum of individual values indicative of a likelihood of the digital user action event to occur within a time period;
    determine an aggregated user data set for a set of user identifiers that are associated with instances of the digital user action event;
    determine an average automaticity score for the digital user action event at the number of user sessions using the aggregated user data set;
    determine that the automaticity score is equal to or greater than the average automaticity score; and
    modify a user category of the user identifier.

20. The device of claim 19, wherein the digital user action event is a first instance of the digital user action event, and wherein the at least one processor is further configured to access the at least one memory and execute the computer-executable instructions to:
  determine a predicted date and time for a second instance of the digital user action event;

generate a discount offer for the user identifier; and
cause the discount offer to be presented prior to the predicted date and time.

\* \* \* \* \*